No. 864,598. PATENTED AUG. 27, 1907.
W. P. BAYNES.
POULTRY TRAP NEST.
APPLICATION FILED NOV. 2, 1906.
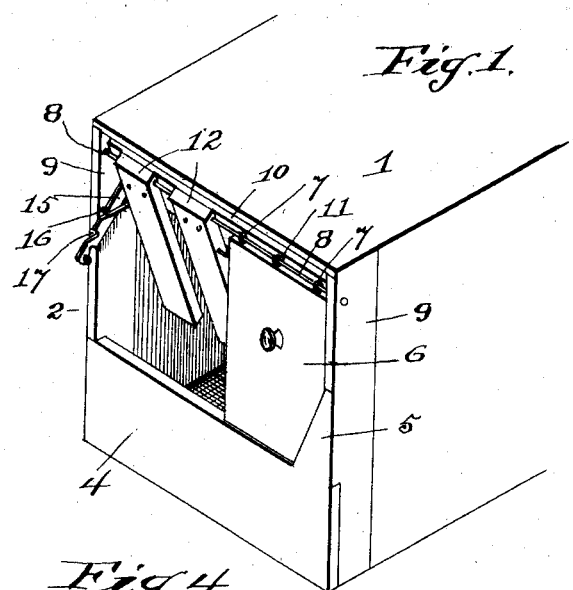
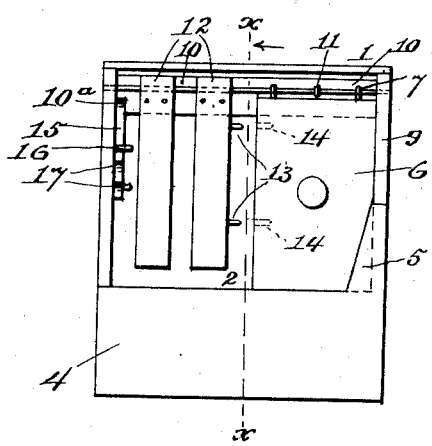
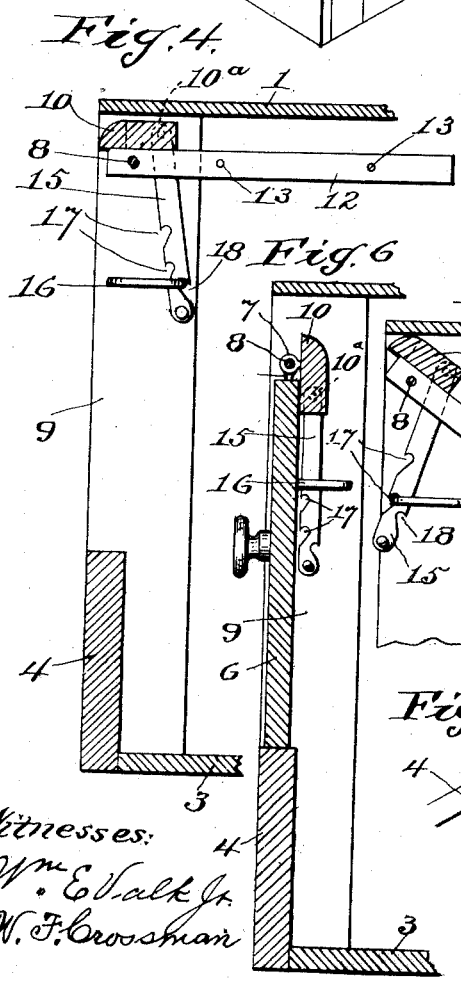
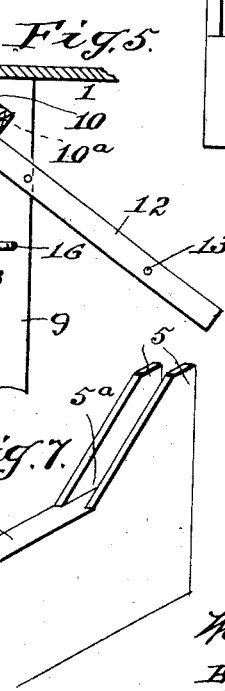
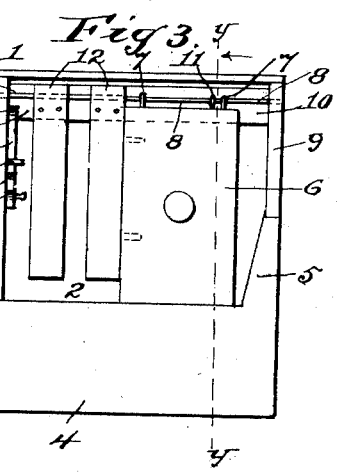
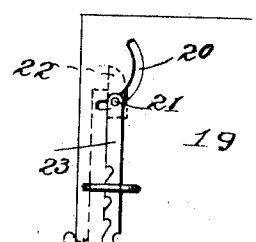
Witnesses:
Wm. E. Valk Jr.
W. F. Crossman
Inventor
Walter P. Baynes
By C. F. Belt
Attorney

UNITED STATES PATENT OFFICE.

WALTER P. BAYNES, OF SALEM, INDIANA.

POULTRY TRAP-NEST.

No. 864,598.     Specification of Letters Patent.     Patented Aug. 27, 1907.

Application filed November 2, 1906. Serial No. 341,759.

*To all whom it may concern:*

Be it known that I, WALTER P. BAYNES, a citizen of the United States, residing at Salem, in the county of Washington and State of Indiana, have invented certain new and useful Improvements in Poultry Trap-Nests, of which the following is a specification.

This invention relates to poultry culture, and especially to individual hen nests adapted to be adjusted for a general hen nest or a trap nest.

The object of this invention is to provide in a poultry nest, an entrance and exit door of such novel and peculiar construction that it may be used either as a general nest or as an individual or trap-nest, and when the door is set for a trap it may be thrown by a hen entering the nest.

A still further object of the invention is to provide in a hen nest, a door, part of which is adjusted to either swing with the other part or to be held fixed during the swinging of said other part.

A still further object is to provide novel and peculiar means for hanging and controlling the swinging and sliding movements of the door parts.

In the accompanying drawings forming part of this application: Figure 1 is a perspective view of the front end of a hen-nest showing the door set as a trap. Fig. 2 is a front view showing the door closed for a trap nest. Fig. 3 is a similar view showing the door parts coupled. Fig. 4 is an enlarged section on the line $x$—$x$ Fig. 2, showing the trap-door raised. Fig. 5 is a similar view partly broken away showing trap-door set. Fig. 6 is an enlarged section on the line $y$—$y$ Fig. 3. Fig. 7 is a detail perspective view of the keepers. Fig. 8 is a side elevation of part of the nest showing a modified means for operating the door.

The same reference numerals denote the same parts throughout the several views of the drawings.

The hen house, box or nest 1, may be of any desirable shape or capacity, and of such material as may be found most convenient. The front has a door-way 2, and floor 3, having a deep front panel 4 reaching to the floor and forming the door sill. One of the lower corners of the door-way is provided with keepers 5, forming a groove $5^a$ in and from the door sill upwardly in one side of the door-way or jamb to hold one part of the door from swinging.

The door consists of two parts, one part 6, is pivoted or hinged by eyes 7 to a rod 8, which is secured at each end to the sides of the box or nest, or in the door jambs 9, and said rod is pivotally connected over the door part 6 to a bar 10, by one or more eyes 11, so that the door part 6 may be slid between the keepers 5, to hold it against swinging. The other door part comprises two or more slats 12, or other suitable open work attached to the bar 10, so as to swing with it on the rod 8, independent of the door part 6, thus forming an individual or trap nest. In this position the door part 12, is free to swing inwardly, but its outward swing is controlled by the bar striking the door part 6. The door part 12, has one or more pins 13, projecting therefrom to engage holes 14, in the edge of the door part 6, for purpose of coupling the door parts together when the door part 6, is slid toward the door part 12. With the door parts thus coupled they are free to swing together with the swinging of the bar 10, and adapts the nest or box for a common or general hen house.

The movement of the rod 8, and hence the swinging of the door parts and their position to vary the doorway opening is effected by means of a lever 15, pivoted to the bar 10, at $10^a$, eccentrically to the pivot or hinge connections between the rod 8, and the door parts. The lever works through and in connection with a staple 16, or other suitable or equivalent device and is provided with front notches 17, adapted to engage the staple for holding the door in various positions to partly open and close it, and a notch 18, is formed in the back edge of the lever which engages the staple to hold the door raised to its full height.

While I have shown the lever upon the inner side of the door jam, it may be hung upon the outside of the nest as shown by the modification in Fig. 8, in which the nest side 19, has an arc or semi-circular slot 20, through which a projection 21, from the bar 22 extends, and the lever 23 is pivotally hung from said projection.

It is obvious that when the lever 15, is set to fix the door as a trap, said lever is dislodged and the door part 12, dropped by reason of a hen coming in contact with said door part in entering the nest.

It will be seen that the door parts may be coupled and uncoupled expeditiously, that both parts may be made to swing together, that one part may be held immovable while the other part is free to swing, and that by simply moving the adjusting lever the swinging position may be varied as desired.

I do not wish to be understood as limiting myself to any particular means for holding the sliding part of the door, or to any special means for holding the swinging part of the door in various position with or without said sliding door part, as these devices may be varied mechanically in the practical application of the invention without departing from the spirit of the invention.

Having thus described my invention what I claim as new and desire to secure by Letters Patent is:—

1. A poultry nest door comprising a trap portion hung to swing, and a portion hung to slide to and from the trap portion and adapted to be coupled with the trap portion to swing with it, means for coupling the door portions, and a rod upon which the door-portions are hung.

2. The combination, with a poultry house, of a two part vertically swinging door one part thereof adapted to be swung independent of the other part, a rod having both of the door parts pivotally connected therewith and upon which one of said door parts is slidable, and means for holding one of said parts against swinging.

3. The combination, with a poultry house having a door way, of a two-part swinging door one part comprising a trap to swing independent of the other part, the other part adapted to be slid horizontally into one position to partly close the door-way and into another position to be swung with the said trap part to open the door way, a bar having the trap part attached and the other part slidably connected thereto, a rod to which said parts and the bar are pivoted, and means for connecting the door parts and means for holding the slidable door part.

4. The combination, with a poultry house, of a door comprising two parts adapted to be joined for swinging together and to be separated for only one part thereof to swing, a swinging bar attached to one of the door-parts, and a rod to which the bar is pivoted and having the other door-part pivotally and slidably hung therefrom.

5. The combination, with a poultry house, of a door comprising two parts adapted to be joined for swinging together and to be separated for only one part thereof to swing, a bar to which one of the door parts is secured, a rod pivotally hanging the door parts and having said bar pivoted thereto, and means to hold the bar in adjusted position to vary the position of the swinging door.

6. In a two-part door for trap-nests, the combination, with a bar carrying one part of the door, and a rod pivotally suspending the bar and the other part of the door, of a lever pivoted to the bar eccentric to the said rod for swinging the bar, and a suitable catch to hold the lever in various positions.

In witness whereof I hereunto set my hand in the presence of two witnesses.

WALTER P. BAYNES.

Witnesses:
THOS. A. SMITH,
JERRY JAMISON.